March 7, 1961 E. E. REYNOLDS 2,973,898

REGISTERS

Filed Aug. 23, 1957 5 Sheets-Sheet 1

INVENTOR.
Eugene E. Reynolds
BY Clarence W. Martin
AGENT.

INVENTOR.
Eugene E. Reynolds
BY Clarence W. Martin
AGENT.

March 7, 1961 E. E. REYNOLDS 2,973,898

REGISTERS

Filed Aug. 23, 1957 5 Sheets-Sheet 3

INVENTOR.
Eugene E. Reynolds
BY Clarence W. Martin
AGENT.

March 7, 1961 E. E. REYNOLDS 2,973,898

REGISTERS

Filed Aug. 23, 1957

5 Sheets-Sheet 4

INVENTOR.
Eugene E. Reynolds
BY Clarence W. Martin
AGENT.

March 7, 1961 E. E. REYNOLDS 2,973,898

REGISTERS

Filed Aug. 23, 1957 5 Sheets-Sheet 5

INVENTOR.
Eugene E. Reynolds
BY Clarence W. Martin
AGENT.

United States Patent Office 2,973,898

Patented Mar. 7, 1961

2,973,898

REGISTERS

Eugene E. Reynolds, Richmond Annex, Calif., assignor to Marchant Calculators, Inc., a corporation of California Filed Aug. 23, 1957, Ser. No. 679,819

22 Claims. (Cl. 235—61)

The invention relates to a mechanical shift register for displaying the results of a computation. A multi-digit value is read into the register in serial form and either the highest significant digit or the lowest significant digit may be entered first. The register is cyclically operated and a single digit is entered into the register's units order, for example, during each cycle. The digits standing in the respective orders of the register are shifted one order each cycle to an adjacent higher order. The indicating elements of the register are mechanical toggles and each toggle stands at a value representative position until moved to a different value representative position.

The invention is used to read out a multi-digit value from various types of computing equipment. The value may be in the binary or any larger radix system, including the decimal system. A value which has been read out may be visually noted or mechanically sensed.

More specifically, a register according to the invention comprises a pair of adjacent frame members which are arranged for parallel movement with respect to each other. That is, one or both members cyclically reciprocate in close proximity to each other. A clutch mechanism is incorporated with the power source so that the number of reciprocatory cycles may be controlled. A series of ordinally located toggle elements are pivoted to a face of one frame member, and similar toggle elements which are pivoted to an adjacent face of the other frame member are provided, one each between each adjacent pair of toggles. All of the toggles on one frame member are value indicating toggles whereas the toggles on the other frame member merely serve as value transfer, or shifting devices. These toggles are referred to hereinafter as ordinal and interordinal toggles, respectively.

A suitable detent mechanism is provided to hold each toggle at either one of two stable positions. In its simplest form, the invention is operable to indicate binary values, that is, the presence or absence of a bit of information in each order of the register. Therefore, the ordinal toggle elements are sensed, and if found to be set to a first position, will thus indicate the binary "naught," whereas, if this toggle is found to be set to its second binary position, it will thus indicate the binary "unit." Therefore, the first position of each ordinally located toggle element is indicative of a binary zero or naught, and the second position is indicative of binary one or unit.

The toggles are designed to interact during each cyclic reciprocation to transfer a bit from each toggle to its adjacent higher order toggle. A mechanical representation of the value is transferred during each operating cycle, from an ordinal to an interordinal toggle and then from an interordinal to an ordinal toggle; thus, it will be clear, that the interordinal toggles stand at a significant value representative position for one-half of a cycle, and the ordinal toggles stand at such position for the succeeding other half of the same cycle. Therefore, either the ordinal or interordinal toggles may be sensed. In this description of the invention, however, the shift register is sensed for data only at the ordinally located toggles.

It is understood that the ordinal and interordinal toggles need not be formed alike; however, for ease of manufacture these elements are similar in all but one respect. The only difference among the several toggles, is the existence of an indicator tip on the ordinally located toggles. This tip indicates a discrete value by standing at either its first or second position, and the tip is designed in each case, with a specific sensing method in mind.

The invention in its simplest concept, is an array of ordinally located indicator tips, which are successively each set in a timed relation to the corresponding cyclic speed of frame reciprocation. For example, if cyclic frame reciprocations were to stop five cycles after a binary unit is introduced, the toggle in the fifth ordinal location of the shift register would be set with its tip in the binary unit representative position. If the frame were further reciprocated, the shift of the bit would continue toward the higher ordinal end of the register.

An object of the invention is to provide a small high-speed mechanism for ordinally shifting data.

A further object is to provide a shift register which is especially suited to receive a serially occuring data pulse train, and continuously operate to translate these pulses into mechanical representations.

An additional object is to provide a plurality of ordinally arranged toggles which are each settable to a discrete value representative position to register a predetermined result.

A further object is to provide a mechanical shift register which permits flexibility in the manner of sensing the value stored in the register.

A further object is to recirculate a value by mechanical means.

An additional object is to recirculate a value in a mechanical shift register and simultaneously perform non-destructive read-out of the recirculated value.

Another object is to provide a shift register which will receive and translate impulses in either mechanical or electrical form and which will mechanically shift such data from order to order.

A further object is to provide a shift register which upon being used to store a data word may be subsequently operated to shift the ordinally stored word to the higher ordinal end of the register where the word may be retranslated seriatim into mechanical or electrical impulses.

An additional object is to provide a shift register comprising a plurality of ordinally located bistable elements and a plurality of interordinally located bistable devices.

A further object is to provide a recirculating shift register which performs recirculation of contained data by pure mechanics and to selectively introduce new data which supersedes the old data.

A further object is to provide shift registers of the invention, arranged in banks for simultaneous operation whereby a multiordered word in any radix may be introduced in parallel or in serial fashion.

An additional object is to provide a buffer storage shift register which is operable under the control of a single key to immediately assume the data indication representative of the value of the key depressed.

An additional object is to provide such a buffer storage register with the added feature of an electrical data translator operable at the higher ordinal end of said register, for retranslating stored data into electrical pulses.

A further object is to simultaneously operate a buffer storage register and a data recirculating shift register and to shift data from the buffer storage register into the data recirculating shift register.

A further object is to provide a method of disassociating the data recirculating shift register from the buffer storage register controlled intervals of time to thereby permit the recirculating register to mechanically recirculate contained data and/or read out such data.

A further object is to provide an electrical data translator at the higher ordinal end of the recirculating shift register for the purpose of read-non-destructively reading out recirculating data to an associated shift register.

An additional object is to provide a data shifting device which may be used as a decimal point indicator behind the carriage cover of a desk calculating machine.

In order that the invention may be more readily practiced by others, it will be described in terms of several express embodiments given by way of example only and with reference to the following drawings in which.

Figures 2, 6:
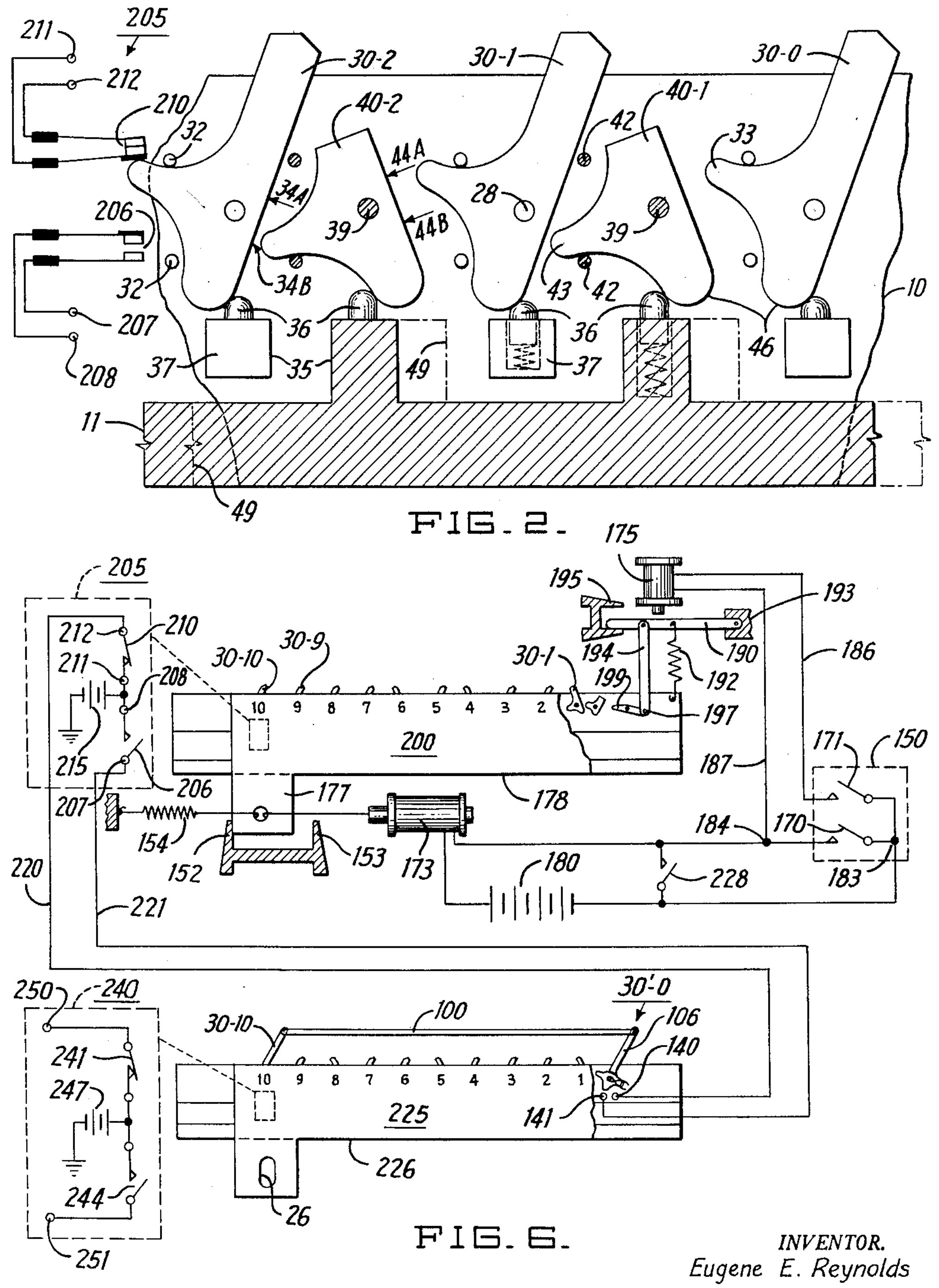
Fig. 2 is an elevation showing the two lower orders of a mechanical shift register.
Figure 4:
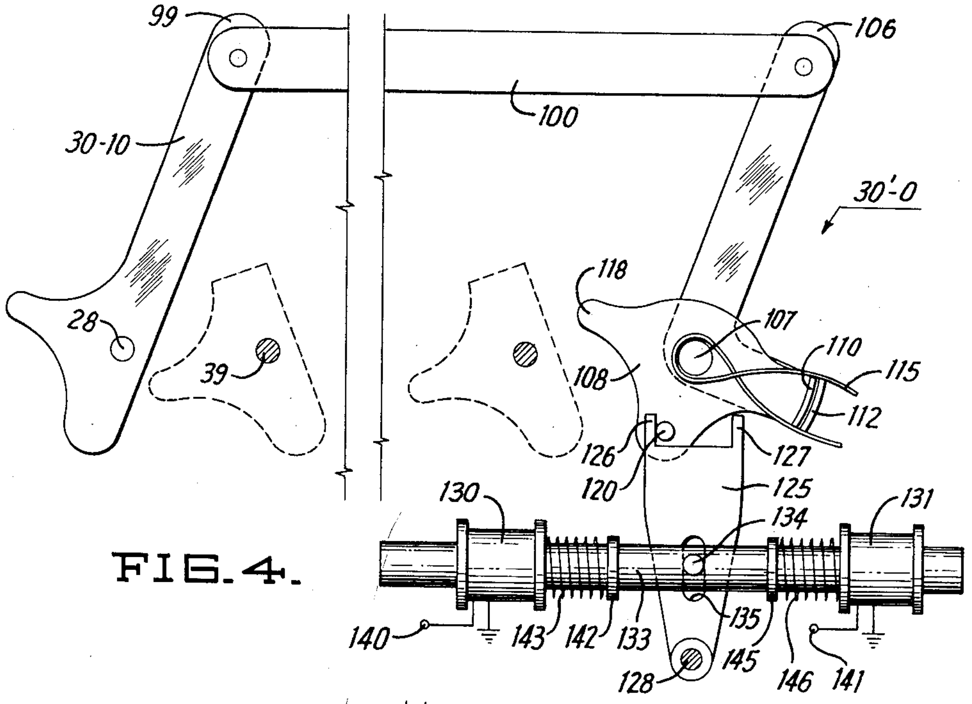
Figure 5:
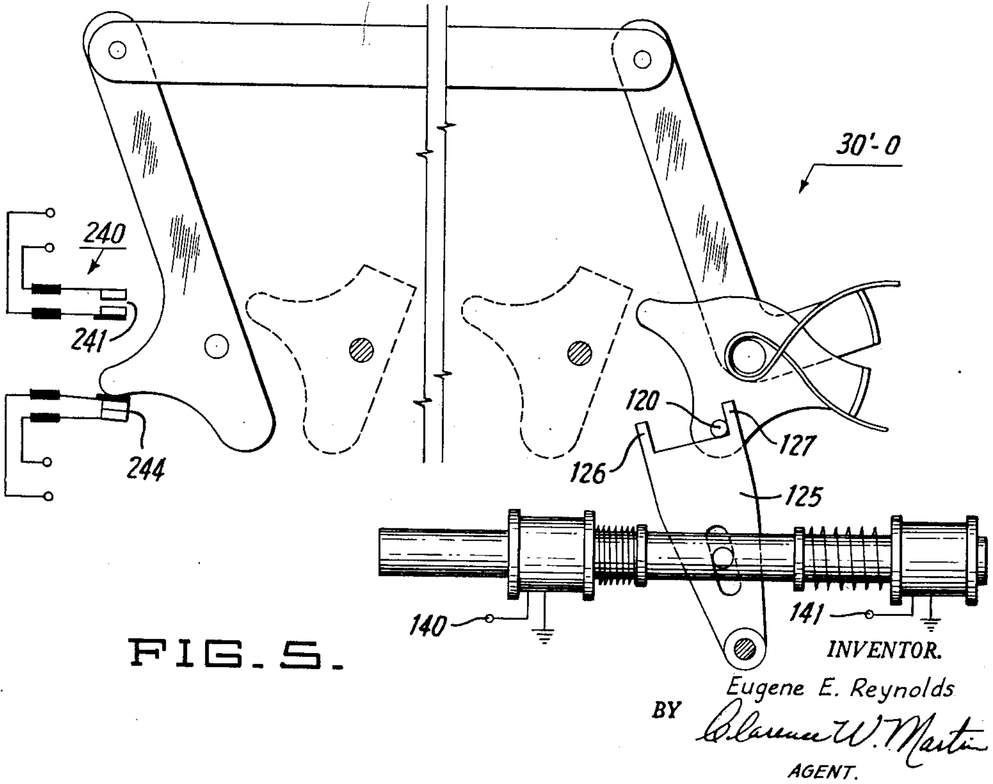
Figure 7:
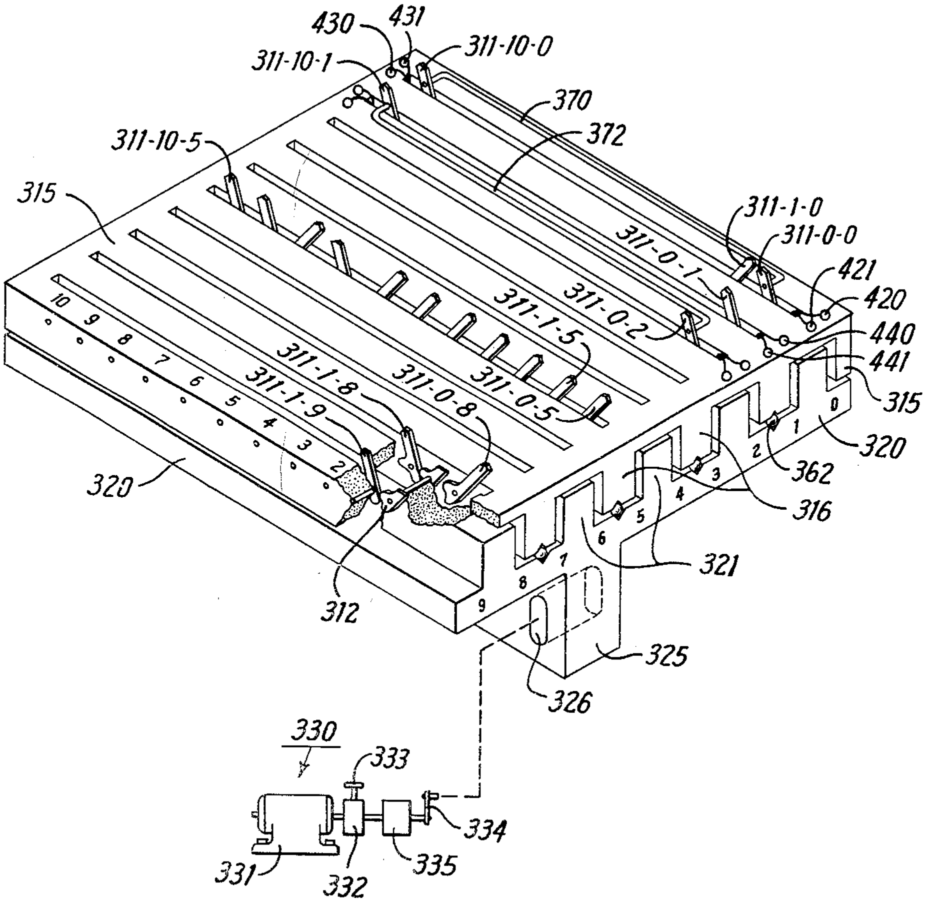

Figs. 3A–3E comprise a series of diagrams depicting ordinal data transfer;

Fig. 4 is an enlarged elevation of the lowest and highest orders of a recirculating register and shows an input superseding mechanism;

Fig. 5 shows the mechanism of Fig. 4 in an operated condition;

Fig. 6 shows a buffer storage mechanical shift register under the control of a binary keyboard, and also shows a recirculating mechanical shift register;

Fig. 7 shows a bed of ten adjacent mechanical shift registers.

*General description*

Figure 1:
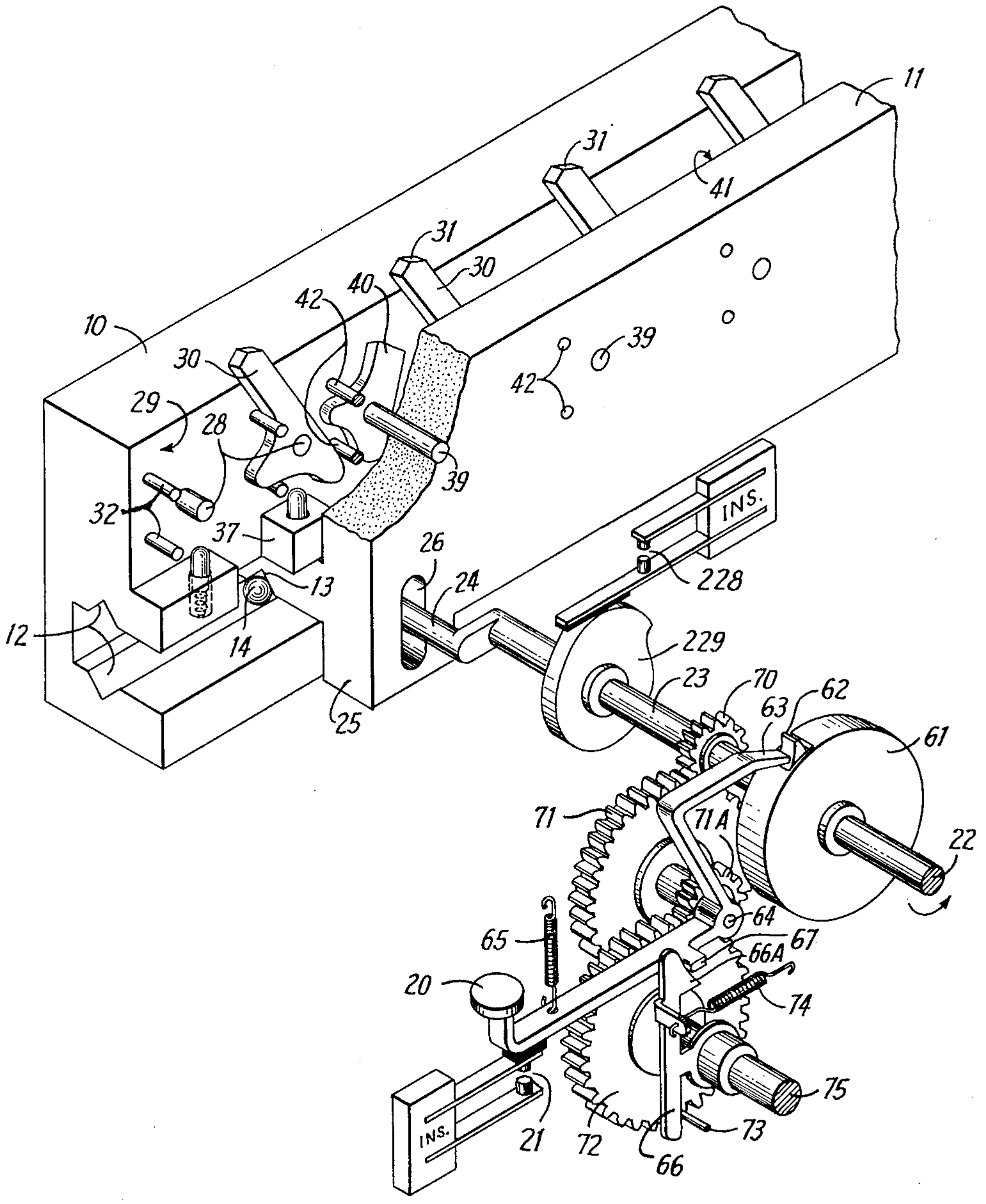
Fig. 1 is a projection showing the higher ordinal end of a mechanical shift register and the details of the drive mechanism according to the invention.

The mechanical shift register shown in Fig. 1 is a binary register with only the leftmost orders being illustrated. The structure comprises a frame member 10 having two raceways 12 milled lengthwise thereon. A carrier frame 11 is located adjacent frame 10 and likewise has two raceways 13, only one of which can be seen in this view, which raceways are milled lengthwise on frame 11. The opposed pairs of raceways 12 and 13 form two channels for receiving ball bearings 14. The balls 14 are closely fitted into the raceways between the frame members and in this manner will allow substantially only linear movement between the frame members.

Pivot pins 28 are fixed on frame 10 in ordinal spatial relationship and each carries a registering toggle 30. Face 41 on the carrier frame 11 is substantially parallel to face 29 of frame 10, and pivot pins 39 are fitted into the face 41. Each pivot pin 39 carries on interordinal toggle 40. The pivot pins 39 lie between adjacent pins 28.

The disclosed mechanical shift register comprises ten value registering orders and this requires that there be ten registering toggles 30, one for each ordinal location. There is also provided an interordinal toggle 40 for each order of the register. The toggles may be designed in a variety of shapes but for ease of manufacture are generally similar. The ordinally located toggles 30 differ from the interordinally located toggles 40 merely in that the indicating tips 31 on toggles 30, projects above the frames and are longer than the upper ends of toggles 40.

In order to shift a bit of binary information from one registering toggle 30 to the next higher order registering toggle, the carrier frame 11 is reciprocated once with respect to the frame 10. Assuming for the purpose of illustration that a ten order binary value stands in the register, then this value may be read out and/or cleared by means of a driving motor (not shown) and a ten cycle clutch. Depression of an operation initiating key 20 closes the switch contacts 21 of a power circuit for a drive (not shown). The motor then drives a shaft 22. A shaft 23 is coaxial with shaft 22 and a cyclic clutch 61 is provided to selectively connect shafts 22 and 23.

Reference is made to U.S. Patent No. 2,009,010, Fig. 2, for details of construction of this clutch. The clutch normally is disengaged by virtue of contact of a tip 63 on the operation initiating key 20 with the clutch dog 62. When the key 20 is depressed, the tip 63 is rocked counterclockwise about a pivot 64 and releases the dog 62 to thus cause engagement of the clutch. The clutch would operate only for a single revolution if spring 65 were allowed to immediately return tip 63 into the path of the dog 62; however, a latch 66 is provided to override an ear 67 on the key shank when the key 20 is depressed and holds the tip 63 out of range of the dog 62.

A small spur gear 70 is fixed to the driven shaft 23 to move counterclockwise therewith and is continually enmeshed with an idler spur gear 71. The idler gear 71 carries a smaller idler gear 71A which is continually enmeshed with a large spur gear 72. The speed reduction between gear 70 and gear 72 is 10:1. This ratio corresponds to the number of orders in the shift register. If, for example, 20 orders were used, then the gear ratio should be 20:1. A small stud 73 is fixed to gear 72 near the periphery, and is in such a position that as the ten cycles of operation near completion, the stud will have moved with gear 72 in a counterclockwise direction so that the stud contacts the lower portion of the latch 66. In this manner the stud 73 rocks the latch 66 counterclockwise about its mounting shaft 75, and thus releases the ear 67 from the latch. Such release is timed to occur prior to completion of the tenth cycle and allows spring 65 to urge the tip 63 into engagement with the periphery of clutch 61. The tip 63 engages the dog 62 and disengages the clutch 61 at the end of the tenth cycle. At the same time, the stud 73 rides under the lower portion of latch 66 and a spring 74 urges the latch to position shown, as the driven mechanism of the clutch comes to rest. In this manner the driven member 23 of the clutch 61 is moved in a counterclockwise direction ten full revolutions each time the operation initiating key 20 is depressed.

An eccentric crank 24 (Fig. 1) is fixed to the end of the driven clutch shaft 23. This eccentric crank 24 fits closely within an oblong slot 26 cut into a downward extension 25 of the carrier frame member 11. As the eccentric 24 rotates ten cycles in a counterclockwise direction within the slot 26, it will cause the carrier frame 11 to be reciprocated ten times.

The structural details of the mechanical shift register are more clearly illustrated in Fig. 2, which shows the rightmost end of the register. The upright side of the carrier frame 11, shown in Fig. 1, has been cut away for clarity.

The registering toggle 30–1 is located in the first order of the register, and a registering toggle 30–2 is located in the second order. A toggle 30–0 is provided for entering values into the register. An interordinal toggle 40–1 is located between the registering toggle 30–1 and the adjacent value entry toggle 30–0, and an interordinal toggle 40–2 is shown between the first ordinal toggle 30–1 and the second ordinal toggle 30–2. The structure shown for the first two orders is likewise provided for all remaining orders of the register.

The register stands in the initial position shown in Fig. 2. The registering toggles 30–1 and 30–2 and the value entry toggle 30–0 are each standing in their clockwise positions. This position represents a binary "zero" or naught. The counterclockwise position of these toggles represents a binary "one" or unit. The interordinal toggles 40–1 and 40–2 are shown in Fig. 2 in their counterclockwise or binary naught indicative position. Each interordinal toggle may be moved to clockwise or binary unit indicative position.

A respective pair of stop pins 42 are mounted for movement with the carrier frame 11 and limit the pivotal movement of toggles 40. The registering toggles 30, likewise, each have two stop pins 32 mounted in the main frame 10 for a similar purpose.

The registering toggles 30, the value entry toggle 30–0, and the interordinal toggles 40, each have a respective detent mechanism 35 located directly below their respective pivot pins. The detent mechanism urges the respective toggle to stand in one or the other pivoted position where the respective toe projection 33 or 43 of the toggle contacts a stop pin. The registering toggle detent mechanism comprises a detent block 37 formed on the main frame 10. Each detent block 37 is drilled to receive a compression spring and a detent plunger 36. The plunger in each case is urged to rise and contact a rounded bottom surface 46 of a respective toggle.

The detents for toggles 40 differ from the detent for toggles 30, only in that they are formed on the carrier frame 11 and move with their respective interordinal toggles 40. The interordinal detents are each located directly below the pivot pin 39 of the corresponding interordinal toggle.

The carrier frame 11 and attached toggles 40 are shown in Fig. 2 in initial position, which is the full cyclic position of the clutch. The carrier frame is cyclically driven to execute first a rightward stroke to the dotted line position 49 and completes the cyclic reciprocation by returning leftward from the dotted line position to the full line position. A single cyclic reciprocation of a register is hereinafter understood to comprise a single rightward stroke followed by a leftward stroke of the carrier frame.

*Value entry and shift mechanism*

Reference is made to Fig. 3 where the distinct steps of value entry and shift are schematically indicated. In Fig. 3 the data introducing toggle 30–0 is indicated in a so-called zero order of the register, and the registering toggles are shown in corresponding first and second register orders. Fig. 3A is a reproduction of Fig. 2; however, only the toggles have been reproduced for the sake of clarity.

Figure 3A:
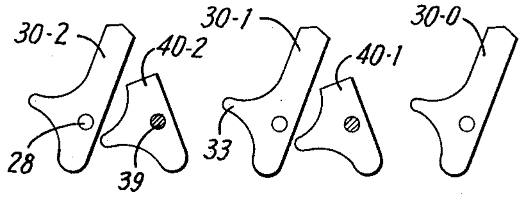
Figure 3B:
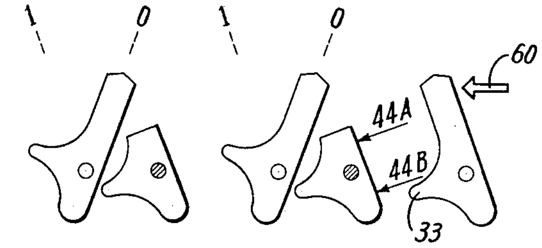
Figure 3C:
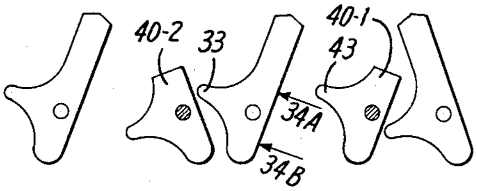

Introduction of a value comprises moving the value entry toggle 30–0 to a representative position at a proper period during the reciprocatory cycle. In Fig. 3A the value entry toggle is shown in its binary "naught" position and in Fig. 3B this toggle is shown in its binary "unit" position. The movement of toggle 30–0 to the binary unit position must occur during the cyclic period when the carrier frame 11 is near its left-hand end and the interordinal toggle 40–1 is out of the range of contact of the toe toggle 30–0. The means for moving toggle 30–0 may be of any form and is illustrated as being merely a mechanical force directed to rock the toggle 30–0 in the direction of an arrow 60. A suggested device for moving toggle 30–0 would be a solenoid which easily may be timed to operate synchronously with reciprocations of the carrier frame. This force repositions the toggle 30–0 from the binary naught indicative position shown in Fig. 3B to the binary unit indicative position, shown in Fig. 3D.

After the toggle 30–0 is set in one or the other position, the carrier frame executes a rightward stroke and moves the interordinal toggle 40 toward the right. The rightward stroke immediately brings the lower heel area 44B of the interordinal toggle 40–1 into engagement or contact with the toe projection 33 of the value entry toggle 30–0. The interordinal toggle 40–1 is rocked clockwise from its first position to its second position (Fig. 3C), prior to the end of the rightward stroke. The detent cooperating with this interordinal toggle 40–1 holds the toggle in its new position.

Figure 3D:
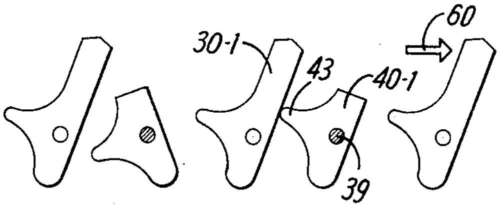

A leftward stroke next occurs to complete the first cycle and to cause the value indication of the interordinal toggle 40–1 to be transferred to the adjacent registering toggle 30–1. The leftward stroke immediately causes the toe projection 43 (Fig. 3C) of the interordinal toggle 40–1 to contact an upper heel area 34A of the registering toggle 30–1 (Fig. 3D). The toe 43 remains in engagement with the heel area 34A for a portion of the stroke and acts through this contact to drive the registering toggle 30–1 (Fig. 3E) from the binary naught position to the binary unit position. It will be noted that in Fig. 3E the unit position of the registering toggle 30–1 corresponds to the binary unit position to which toggle 30–0 was set, and that one cycle was required to cause an ordinal shift of the binary unit from the zero to the first order of the register.

The above-described first cycle of operation causes the interordinal toggle 40–2 (Figs. 3A to 3E) to idly move toward the right and then to the left. Since the toggle 30–1 which controls toggle 40–2 stands in its naught position during the rightward movement of the toggle 40–2, the toggle 40–2 does not contact toe 33 of the registering toggle 30–1, and therefore the position of the toggle 40–2 remains unchanged. Also, since the position of toggle 40–2 remains unchanged, the position of toggle 30–2 remains unchanged.

During the described first leftward stroke, a binary naught or unit may be entered in toggle 30–0. If the value to be introduced in the second cycle is a unit then the position of the toggle 30–0 remains unchanged; however, if the next value is a naught then a reverse action of the force 60 on toggle 30–0 is required. Such a naught introduction occurs in Fig. 3D. A binary naught entry must occur while the carrier frame 11 is near its left-hand position.

Figure 3E:
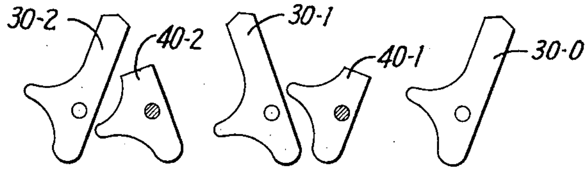

During a second cycle, which commences with the register components positioned as shown in Fig. 3E, the binary unit is shifted from toggle 30–1 to toggle 30–2, and the newly entered value of naught will at the same time be shifted from toggle 30–0 to 30–1. Such shift of values occurs in the same manner as described above; however, it should be noted in Fig. 3E, during the second rightward stroke, each interordinal toggle 40–1 and 40–2 contacts a toe projection of a respective registering toggle 30 in the adjacent lower order. This contact causes each interordinal toggle to reverse position to thereby assume a corresponding value representative position. During the leftward stroke of the second cycle, the newly set interordinal toggles each engage the adjacent registering toggle in the corresponding order and sets the corresponding registering toggle to the binary value that was previously indicated by the lower order registering toggle. In the second cycle a unit was entered in the second order and a naught was entered in the first order. Each succeeding cycle of operation would cause the binary unit to be ordinally shifted in the direction of ascending orders with the naught following the unit.

It should be made clear that when any toggle rocks a second toggle to a new position, a force is exerted on the first toggle tending to hold it in its current position. For example, in Fig. 3D, the toe projection 43 moves leftward to rock the registering toggle 30–1 counterclockwise to a unit position. During the movement of toggle 30–1 by toggle 40–1 from the binary naught to the binary unit position, forces act on the interordinal toggle 40–1 which are momentarily directed through the toe 43 toward the pivot 39 and thereafter always tend to rock the toggle 40–1 in a clockwise direction, i.e., in the direction urged upon it by its detent. There is no tendency for the interordinal toggle 40–1 to be moved from its set position.

It will be recalled that a ten cycle driving mechanism is utilized to cause the carrier frame 11 (Fig. 1) to execute ten consecutive cycles of reciprocation. By adjustment of the data introducing toggle 30–0 in timed relationship to the reciprocation as previously mentioned, a binary word is introduced to the ten order register. The binary word is visually displayed by noting the relative positions of the registering toggles 30. The registering toggles each have the indicator tip 31 (Fig. 1) on their upper end for the express purpose of physically indicating the current position thereof. When an indicator tip 31 is in its leftward stable position, it represents a binary unit and when it is in its rightward position it represents a binary naught.

The word value comprises only ten binary denominational orders; however, a much greater ordinal capacity may be provided by simply duplicating the existing ordinal structures.

*Data recirculation*

A value may be recirculated in a register by serially shifting the same value repeatedly through the register. Electronic shift registers are well known in the art; however, one problem appears to be inherent in such registers, namely, it has been difficult to obtain correct timing relationship between the sensing of a value at one end of the register and the utilization of that value either for purposes of recirculation or other purposes inherent in the particular system employed. A clock pulse or timing pulse generator has frequently been used heretofore to effect such timing; however, such generations are expensive and would not be necessary if a predetermined reading time were inherent in the operation of the register.

The invention requires no ancillary timing device such as a clock pulse generator because correct timing of reading of successive digits is inherent in the operation of the invention. That is, a recirculating mechanical shift register generates digit representations at the exact speed necessary for reintroduction of that digit. This is true regardless of the particular speed at which the value is recirculated. An experimental prototype of the invention has successfully recirculated values at speeds as high as 60 digits per second.

In order to provide recirculation in the present ten order shift register, it is necessary to extend the indicator tips 31 of the zero and tenth order registering toggles, and connect the extended toggles by a recirculation link 100.

In the present embodiment the tenth order toggle has an extension 99 (Fig. 4) which is connected by link 100 to a lever 106. The lever 106 is resiliently connected by a spring 115 to a member 108, which spring overlies ears 110 and 112 of the member and lever respectively. For purposes of present illustration, it will be assumed that the spring does not yield and that lever 106 and member 108 act as in integral unit. This unit is referred to hereinafter as the resilient assembly 30–0. When acting as an integral unit, the resilient assembly 30–0 is the equivalent of a value entry toggle 30–0; and for purposes of present illustration will be referred to as the value entry toggle 30–0. The toe 118 on member 108 is similar in all respects to the previously described toe 33 of the toggle 30–0.

When a data word is stored in a ten order recirculating shift register, ten cycles of operation will shift the word ten orders and simultaneously perform recirculation. The link 100 re-enters a value at toggle 30–0 at the same time as the value is entered into the tenth order. At the conclusion of the ten cycles of operation, the discrete word will be available and each toggle stands in the same position it stood prior to the recirculating operation. It is understood that if the operation were not ten cycles long but were made continuous, the discrete data would continue to be shifted and re-entered. The discrete word would stand in its initial respective ordinal location in the register during each succeeding tenth cycle. Therefore, in order to conclude with the word in its original ordinal location, a recirculating operation should be terminated at the end of any tenth cycle.

As a side light to the foregoing, it is pointed out that if the recirculation link 100 were connected between the zero and ninth order registering toggles of a ten order shift register, the discrete word would itself be left-shifted one ordinal location during each succeeding ten cycle operation. Also, if the link 100 were adapted to connect the zero and an eleventh order registering toggle (not shown), the word would be right-shifted one ordinal location in each ten cycle operation. In the same manner a discrete pair of interordinal toggles may be similarly interlinked to perform recirculation and right or left shifting as described.

It has been shown that when the shift register initially contains a selected data word, the disclosed structure performs recirculation without auxiliary equipment other than the recirculation link 100. However, means are provided to supersede the recirculating mechanism when it is desired to enter new data in a recirculating shift register. When the superseding means is inactive, the register reverts to recirculation of the old data currently standing therein. The superseding means comprises in part the resilient assembly 30–0 and a translator arm 125 for setting the lever 108 independently of the position of lever 106 and the recirculation link 100.

During recirculation the translator arm 125 normally stands in a neutral position, as shown in Fig. 4, to permit a pin 120 on member 108 to rock counterclockwise between fingers 126 and 127 from the binary "0" position shown, to the binary "1" position. The translator arm 125 is mounted to rock about a pin 128 and is acted upon by one of a pair of translator solenoids 130 and 131 to rock to the right or left from the neutral position. The solenoids are operated by discrete data signal pulses so that one solenoid is energized upon receipt of a binary "1" pulse and the other solenoid is energized upon receipt of a binary "0" pulse.

The translater solenoid 130 on the left end of a plunger core 133, is termed the "zeros solenoid" for the reason that zero pulses operate this solenoid to rock member 108 to its clockwise "0" position. The translator solenoid 131 on the right end of the core 133, is termed the "ones solenoid." The "ones" and "zeros" solenoids are bodily fixed to the same framework as is the pivot pin 128. The core 133 is common to the two solenoids and is arranged with an integral pin 134 which lies in a vertical slot 135 in the translator arm 125.

The solenoid 130 is electrically grounded and has an electric terminal 140 to which is applied the binary "0" signal pulses. The solenoid 131 is likewise electrically grounded and has an electric terminal 141 to which is applied the binary "1" signal pulses.

The common core 133 may be cylindrically shaped where it operates within each solenoid. The core has a washer 142 fixed on its shank and between the washer 142 and the face of the zeros solenoid 130 there is a compression spring 143. The spring 143 continually urges the washer 142 and attached core to move rightward as viewed in Fig. 4. There is a matching washer 145 attached to the core near the "ones" solenoid 131 and there is a matching compression spring 146 placed around the core between the washer 145 and the face of this solenoid. Both springs 143 and 146 are compression springs and urge the core to move in opposite direction; therefore, the two compression springs coact as a centralizer and continually urge the core 133 to stand in the centralized position shown in Fig. 4. In this neutral position, it will be recalled, member 108 is free to rock between the two fingers 126 and 127 on the translator arm 125.

Referring again to Fig. 4, if an electrical pulse representative of a binary "0" is applied to terminal 140 of the zeros solenoid 130, the solenoid is energized and immediately draws the contained zero 133 toward the left. This action causes the spring 143 to be compressed; and as the core pin 134 moves leftward, it acts through the slot 135 to rock the translator arm 125 counterclockwise about its pivot pin 128. If the counterclockwise rocking of the translator arm 125 takes place while lever 106 stands in a position indicative of zero, then pin 120 is not moved and the arm idly rocks leftward to place the finger 127 contiguous to the pin 120. In this manner the finger 127 holds member 108 in its zero indicative position until the "0" pulse ceases. When the "0" pulse is terminated the translator arm 125 is returned to neutral by the centralizing action of the two compression springs 143 and 146.

In the converse manner an electrical pulse indicative of a binary "1" may be applied to the ones solenoid 131 terminal 141. This pulse energizes the solenoid and causes the translator arm 125 to pivot clockwise. If this "ones" pulse were to occur while lever 106 stands in a zero indicative position, as in Fig. 4, the force available in the clockwise moving translator arm 125 is sufficient to overcome the resisting force of the centralizer spring 115 and rock the member 108 of the assembly in the counterclockwise direction about the assembly pivot pin 107.

The lever 106 of the assembly remains in the zero indicative position while the member 108 moves its toe projection 118 downward. In moving the toe projection downward the toe 118 is placed in the binary "1" indicative position, thereby effectively translating from the binary "1" signal pulse to a binary "1" indication.

The resilient assembly 30–0 is shown in another of its operating states in Fig. 5. In that drawing the highest ordinally located toggle 30–10 is shown standing in the binary "1" indicative position and the interconnected lever 106 also is rocked to the left where it, too, is indicative of a binary "1." The translator arm 125, however, is rocked counterclockwise from its neutral position in response to energization of the zeros solenoid 130 and the mechanism functions to place the toe projection 118 in the "0" indicative position.

It will, therefore, be clear that regardless of the position of lever 106, the energization of a respective solenoid 130 or 131 will be effective to control the entry of a selected binary value into the shift register upon reciprocation of the supporting frames, in the manner described.

*Register clearance*

To clear the register a zero pulse is applied to terminal 140 during ten consecutive cycles of operation of the frame reciprocating mechanism and this is effective to enter "0" bits in preference to any "1" bits which may be standing in the register.

*Buffer storage embodiment*

An alternate embodiment of the invention is shown in Fig. 6 where the register is employed as a buffer storage device. Structure is provided for operating the basic ten order shift register for single cyclic intervals. The structure includes a binary keyboard 150 comprising a binary one or unit key 171 and binary zero or naught key 170. A suitable single cycle driving unit is employed whereby depression of one of the keys causes the entry of the selected value in the lowest order of the register 200.

The two keys 170 and 171 each close a respective switch in a discrete circuit which includes the battery 180. The "zero" key 170 (Fig. 6) energizes a single cycle solenoid 173, and reciprocates the carrier frame 178 of the shift register 200. The core of the single cycle solenoid is connected to a downward projecting arm 177 of the carrier frame 178. The downward projecting arm 177 from the carrier frame is constructed with vertical sides, and by the use of two stop members 152 and 153, the frame is restrained to execute cyclic stroke movements of predetermined length. The carrier frame is normally urged into contact with stop 152 by a tension spring 154 connected to the arm 177.

The "one" key 171 energizes both the single cycle solenoid 173 and a value entry solenoid 175. The solenoid 175 and the single cycle solenoid 173 are connected through the closed "one" key 171 to the battery 180 and in this manner are energized simultaneously.

The "one" key 171 is connected to the terminal 183 and a lead 186 connects the key to the solenoid 175. A return lead 187 from the solenoid 175 is connected to the second terminal 184. It is noted that the circuit which includes the solenoid 175 and the "one" key 171 is connected to shunt the "zero" key 170. In this manner a circuit is provided under the control of a single manually depressible "one" key 171 which will energize the single cycle solenoid 173 in the usual manner and simultaneously energize the value entry solenoid 175.

The solenoid 175 is arranged with a suitable linkage to control the value entry device. A lever 199, corresponding to the toggle 30–0 (Fig. 2) normally stands in the "zero" position as shown in Fig. 6, to cause entry of binary zeros into the lowest order of the register in the same manner as described in connection with the register of Fig. 2. The solenoid 175 has a mechanical linkage arrangement connected to the lever 199 for introducing each successive bit to the buffer storage register.

The armature 190 of solenoid 175 is connected to the lever 199 through a link 194. One end of link 194 is pivotally connected to the armature 190 and the other end is connected to the lever 199 at pin 197. The linkage is normally urged by a spring 192 to stand in a "zero" indicative position as shown in Fig. 6. When the solenoid 175 is energized, the armature rises to contact an upper stop 195, and moves the indicating toe of lever 199 downward to a "one" indicative position. The operation of solenoids 173 and 175 occurs simultaneously and the frame is cyclically reciprocated one time to cause the binary "one" selection to be entered in the lowest order of the ten order register 200.

The characteristic shift operation occurs in the buffer storage embodiment 200 as each new value entry is made, and the binary word previously entered in the register is shifted one denominational order toward the left. The word contained in the buffer storage register may be serially read out at the highest order of the register, in the numerical order in which the word was originally entered.

In the buffer storage embodiment 200, for example, if the register contained a binary word and the "zero" key were manually depressed ten times in succession, the contained word would be shifted out the higher ordinal end of the register. With this characteristic operation in mind, an additional method of sensing the contents of the buffer storage register will now be described.

*Retranslation of stored data*

A translator switch assembly 205 (Fig. 6) is generally indicated at the tenth or highest order of the buffer storage shift register 200. For purposes of illustration, the translator switch assembly 205 is shown in Fig. 2 as cooperating with the registering toggle 30–2; however, it must be understood that the switch assembly 205 actually cooperates with the tenth order registering toggle 30–10 of the buffer storage register 200 of Fig. 6. The translator switch assembly of Fig. 2 appears in this figure merely to show the cooperative relationship between the switch assembly and a registering toggle.

The translator switch assembly 205 comprises a first switch termed a "ones" switch 206, and a second switch termed a "zeros" switch 210. The ones switch is located below the toe projection of the cooperating registering toggle, and is positioned so that the "ones" switch 206 contacts are closed when the toggle stands at a registration of "1." Conversely, the "zeros" switch 210 is located above the toe projection of the registering toggle, and is positioned so that the contacts of the "zeros" switch are closed when the registering toggle stands at a registration of "0." The toggle 30–2 (Fig. 2) is shown standing at "zero" and the "zeros" switch 210 is closed.

When the "zeros" switch 210 is closed it electrically connects two terminals 211 and 212, and when the "ones" switch 206 is closed it electrically connects two other terminals 207 and 208. The "ones" switch 206 and the "zeros" switch 210 and their respective two terminals are digrammatically reproduced in Fig. 6, beside the highest ordinal end of the buffer storage shift register 200. The two terminals 208 and 211 are connected to one terminal of a battery 215. The opposite terminal of the battery 215 is connected to ground. The battery 215, shown in connection with the translator switch assembly 205, supplies an electrical potential in one of two circuits as determined by the operation of one or the other of the translator assembly switches.

The "zeros" switch 210 of the buffer storage embodiment 200 is shown closed and this electrically connects the battery 215 to an electric lead 220 which in turn is connected to the terminal 140 of a recirculation shift register 225. The battery 215, by a similar arrangement, supplies electrical potential through a closed "ones" switch 206 and through an electric lead 221 to the terminal 141 of the recirculation shift register 225.

The terminals 140 and 141, it will be recalled, are found at the "zeros" solenoid 130 (Fig. 5) the "ones" solenoid 131, respectively, of the resilient assembly 30–6. When energized, the solenoids accordingly adjust the translator arm 125 to a binary "zero" or "one" entry position. This operation of the translator arm 125 will not of itself cause the recirculation shift register 225 to receive and indicate the introduced binary values as explained hereinbefore. For the introduction to be effective, the carrier frame of the recirculation shift register 225 must be reciprocated. Assuming that the buffer storage register 200 (Fig. 6) and the recirculation shift register 225 are driven to reciprocate synchronously with each other, then the operation of the "ones" switch 206 and the "zeros" switch 210 occurs at the proper time to sequentially enter the binary value from the buffer storage register into the recirculation shift register 225. The registering toggle 30–10 of the recirculation shift register 225 is connected to lever 106 by means of the previously described recirculation link 100, and functions to mechanically recirculate values in register 225 during cyclic reciprocations.

The structure shown in Fig. 6 provides a buffer storage register 200 and a recirculation shift register 225. Means are also provided for reading out a value from the register 225 and at the same time recirculating this value in said register. Switches 206 and 210 control the energization of solenoids 130 and 131 (Fig. 5) to adjust the translator arm 125 of register 225 to its "zero" or "one" position; however, if the frame 226 (Fig. 6) is not reciprocated once for each value setting of arm 125, no value will be entered in register 225. Therefore, means are provided for selectively reciprocating carrier frame 226 only when it is desired to enter values from register 200 to register 225. In this manner, a value may be stored and/or recirculated in register 225, while new values are entered in register 220.

The driving structure used in connection with the registers 200 and 225 comprises a ten cycle clutch for reciprocating the recirculation shift register 225 and a switch operated by the ten cycle clutch structure to operate the single cycle solenoid 173 of the buffer storage register 200 for ten successive cycles. A ten cycle clutch mechanism similar to that detailed in Fig. 1 is therefore provided to drive the recirculation shift register 225 of Fig. 6. Cooperating with such clutch mechanism is a cam operated switch 228 (Fig. 1). The switch 228 is operated by a cam 229 attached to the driven shaft 23 of the ten cycle clutch mechanism which operates the recirculation shift register 225. The cam 229 is designed so that when the operation initiating key 20 is depressed the clutch 61 is engaged and immediately causes the lobe of the cam 229 to move and close the contacts of the switch 228. The lobe of the cam 229 is designed to hold the switch contacts 228 closed during each successive revolution of the driven shaft 23, for an interval sufficiently long to energize the single cycle solenoid 173 (Fig. 6). The switch 228 is located in the solenoid circuit which includes the battery 180 and operates in the same manner as the zero key 170, to cause energization of solenoid 173. Obviously the carrier frame 178 of the buffer storage register 200 is reciprocated in the normal fashion each time the switch 228 is closed.

Thus, the driven shaft 23 (Fig. 1) acts through the cam 229 to cause the operation of the switch 228. Meanwhile, the clutch rotates the crank 24 (Fig. 1) which reciprocates the carrier frame 226 of the recirculation shift register 225 (Fig. 6) for ten cycles of operation.

It has been described that the two registers of Fig. 6 are for present purposes placed under the control of the single operation initiating key 20. The depression of this key 20 causes a binary word stored in the buffer storage register 200, to be translated into electrical value representative pulses which are immediately introduced at the lowest order of the recirculation shift register 225. The ability of the buffer storage register to function in the normal manner following a ten cycle read-out operation is not impared. A new binary value could immediately be placed in the buffer storage register through the use of the binary keyboard 150 as previously described. It will be observed that the buffer storage register 200 has no method provided by which it may recirculate a stored word. Therefore, during the ten cycle read-out operation there will be no introduction of new binary data and the read-out operation will always conclude with the buffer storage register 200 standing in a cleared zero condition. The ten cycle read-out operation concludes with the recirculation shift register 225 containing and displaying the ten order binary word previously stored in the buffer storage register 200.

By reversing the leads 220 and 221 the complement of the binary word contained in the buffer storage register 200 may be introduced to the recirculation shift register 225.

If the recirculation shift register 225 is operated independently of the buffer storage register to read out a value standing in register 225, as presently disclosed, it becomes necessary to provide a method of disconnecting the buffer storage register 200 from the driving mechanism which normally causes it to reciprocate with register 225.

One manner of disconnecting the buffer storage register 200, while allowing it to remain operable under the control of the binary keyboard 150, is to provide an additional manually operable switch (not shown) in series with the cam operated switch 228 (Fig. 6). In this manner the switch 228 will continue to operate under the control of cam 229 on the driven shaft 23; however, the operation of switch 228 is rendered ineffective to cause reciprocation of the buffer storage register carrier frame 178 until the proposed manually operable switch is closed.

The structure shown in Fig. 6 therefore teaches how two registers of the invention may be utilized individually as a buffer storage register and a recirculation shift register respectively, and in combination as a value recirculator having a value entering device with supersedes the recirculation mechanism. Mechanism may be provided to operate the recirculation shift register 225 for extended periods of time to thereby recirculate the stored binary word continuously.

*Non-destructive read-out*

Mechanism is provided to permit non-destructive read-out from the recirculating register 225 (Fig. 6). For this purpose, the registering toggle 30–10 of register 225 is adapted to alternatively close the two switches 241 and 244. These switches are operated similarly to the manner of the translator switch assembly 205, in which switches 206 and 210 are closed by toggle 30–10 of register 200. The switches 241 and 244 and battery 247 comprise another translator switch assembly 240 (Figs. 5 and 6) and may be used to control entry of values into a register or other computing mechanism. The toggle 30–10 of register 225 is thus utilized to operate two separate and distinct value entry devices, namely, the recirculation link 100 and the translator switch assembly 240.

Recirculation also may be accomplished with the structure shown in Fig. 6, merely by connecting a "zeros" terminal 250 with terminal 140 and connecting a "ones" terminal 251 with terminal 141 of register 225. The recirculation link 100 would then be redundant for its intended purposes. In this manner the "zeros" terminal 250 and the "ones" terminal 251 is connected to the solenoid which controls input for recirculation, and at the same time the discrete potentials remain available at terminals 250 and 251 for entering value representative electrical pulses into any other data handling equipment. Therefore, the word in the register is read-out without clearing it from the register. This is termed "non-destructive" read-out.

*Multiple rack embodiment*

Thus far in the description of the invention, there has been discussed a single rack of toggles for registering binary values. It is contemplated that an even wider vista of utility is presented when the invention comprises several parallel registers, or racks. The multiple rack embodiment would, for example, comprise four racks for reading out and/or storing binary coded decimal values, or ten racks for reading out and for storing conventional decimal values.

A ten rack embodiment of the invention is shown in Fig. 7. The arrangement is such that there are ten adjacent racks each comprising ten discrete orders. The arrangement shown permits the translation of conventional decimal values in electrical pulse form, to a mechanical representation of the translated pulses. The arrangement handles decimal words occurring serially or in parallel. Considerations such as manner of interrogating the ordinally located toggle indicator tips and the logics of ancillary equipment will determine whether translation takes place serially or in parallel.

A multiple bed 300 of racks is shown in Fig. 7. The lowest ordinal toggle for each rack is numbered 311 and the successive higher orders are numbered 311–2 to 311–10 progressively. The suffix –3 which appears with the toggle reference numeral 311–0–3 for example, indicates the one of the ten racks or registers in which the toggle is located. The ten numbers "1" to "10" on the right end of the bed 300 indicate ten rack channels, each of which is bounded by a vertical surface of the upper frame member 315 and by a vertical surface of the lower frame member 320.

The upper frame member 315 is, for purposes of this description, held stationary while the lower frame member 320 is reciprocated in the normal manner. The frames could as well as each be reciprocated with respect to each other.

The upper frame 315 corresponds to the frame 10 (Fig. 1) and includes a plurality of parallel depending portions 316 (Fig. 7) upon which the registering toggles 311 are mounted. Toggles 311 correspond to toggles 30 (Fig. 2).

Frame 320 corresponds to frame 11 (Fig. 2) and comprises ten upstanding portions 321 (Fig. 7) upon which the interordinal toggles 312 are mounted. Frames 315 and 320 are aligned for reciprocation relative to each other by means of a ball raceway 362.

A projection 325 is shown formed on the lower portion of the lower frame 320. This projection 325 has an elongated slot 326 extending through the projection, which is adapted to receive a driving crank, connected to a cyclically operable power unit. The power unit 330 comprises a motor 331, a cyclic clutch 332, a key 333 and a clutch driven crank 334 which engages slot 326 in frame 320.

For the sake of clarity, Fig. 7 shows channel six or the sixth register as the only register containing and displaying its full complement of registering toggles 311. It is understood that in actual practice each of the ten channels would contain and display ten toggle indicating tips.

The ten registers shown in Fig. 7 may be used in several ways. They may be operated as ten separate binary recirculating registers. For example, the rightmost or first register has a recirculation link 370 connecting toggles 311–10–1 and 311–0–1 for operation as a recirculating register, as previously described in connection with Fig. 4.

An alternative use is to interconnect all of the registers and use the embodiment as a single one hundred order register. For example, a link 372 is connected between the highest order toggle 311–10–2 of the second register with the value input toggle 311–0–3 of the third register. If all ten registers were interconnected in this same manner, a one hundred order register would be provided.

It is to be noted, in addition, that the described one hundred order register has the capability of being cleared in decades. That is, it would not be necessary to follow a 100 bit word with 100 binary zeros for clearance, for by simply applying electrical potential representative of binary zero at the resilient assembly denoted by terminals 420—421 etc., in the zero ordinal location of each register, the clearance operation would be accomplished in only ten cycles of operation.

The structure shown in Fig. 7 is also useful as an operation control device, in the manner of a program unit for computing machinery or similar apparatus. In this suggested capacity the invention is adapted to present a patterned array of indicator stops to the sensing mechanism. The patterned array may be repeated continuously by the use of recirculation and may be altered in a very short time.

A further suggestion for sensing values is to employ a switch with each indicator tip 311 and with a connected electric light and power source to cause the switch to be closed to light the light when the tip is in a selected position.

Another alternative is to omit the above-mentioned links 370 and 372, thus providing ten respective registers corresponding to the decimal values "0" and "1" to "9" inclusive. The toggles 311, which extend above the upper surface of frame 315 may then be employed as the equivalent of a ten order pin carriage for cooperation with ten ordinarily arranged racks as is common in adding machines and other calculating devices, one rack each (not shown) being provided for the ten "units" order toggles 311–1–0, 311–1–1, etc. to 311–1–9. Similarly a respective rack is provided for the "tens" order toggles, the "hundreds" order toggles, etc. Means are known whereby such racks control printing, read out, etc.

Assume now that a binary value has beeen accumulated in an electronic computer, or the like, and that proper binary to decimal translation devices are provided whereby a respective signal is generated for each of the ten decimal digits. In reading out a decimal value of 9078695430, for example, the register mechanism 300 would be operated as follows.

Key 333 is provided which, upon depression, engages a single cycle clutch 332, and through appropriate gearing 335 rotates the crank 334 ten times as disclosed hereinbefore. This causes the frame 320 to be reciprocated ten times. During each reciprocation, a decimal digit is entered in a corresponding one of the toggles 311–1–0 to 311–1–9. In the present case, a "9" is to be entered and the "units" order toggle 311–1–9 is during the first cycle, rocked to its active counterclockwise value indicating position. The next value to be entered is a "0" and during the second cycle of reciprocation of frame 320, the toggle 311–1–0 is rocked to its counterclockwise value indicating position. Meanwhile, in the second cycle the value of "9" is shifted to the "tens" order in the usual manner, where the toggle 311–2–4 is rocked counterclockwise and toggle 311–1–9 is returned to its initial clockwise position. The remaining characters of the decimal word are similarly read into the register at which time a respective one of ten toggles in each order will have been moved to a decimal value representation position. The entire bed of toggles may now be considered the equivalent of a pin carriage as described hereinbefore, in which case the toggles standing in their respective value representative position are sensed by racks to read out the decimal value.

A resilient assembly 30–0, described in connection with Figs. 4 and 5, may be provided at each of the input control levers 311–0–0 to 311–0–9 (Fig. 7). A translator switch assembly 205 (Fig. 2) may likewise be provided to operate at the tenth or other ordinal location of each row of toggles 311 (Fig. 7). The resilient assembly for the first register is represented by terminals 420—421. The resilient assembly for the second register is represented by terminals 440—441. The translator switch assembly for the first register is represented in the drawing as terminals 430—431. Similar resilient assembly switches and translator switches may be provided for each row of toggles. The structure of Fig. 7 therefore performs recirculation by either the use of link 370 or by connecting terminals 430 and 431 to terminals 420 and 421, etc.

Data may be transferred from one register to an adjacent register by the use of link 372 as described, or by merely connecting terminals 430 and 431 of the translator switch assembly of the first row of toggles to the terminals 440 and 441 of the resilient assembly at the second row of toggles.

From the foregoing description, it will be apparent that the invention may be employed for reading out and storing decimal values as well as binary values.

The invention claimed is:

1. In a shift register, a plurality of devices ordinarily mounted on a first framework and each settable from a first to a second stable state position; a plurality of members mounted on a second framework and each settable from a first to a second stable state position, each of said second members being interposed between a respective pair of adjacent devices; cyclically operable drive means for reciprocating said frameworks relative to each other; means for setting a first device to a second stable state position; means operable in response to said reciprocating means and under the control of said first device to move an interposed member from the first stable state position to the second stable state position; and means operable in response to said reciprocating means and under the control of said member to move a second device from the first to the second stable state position.

2. In a shift register: a plurality of registering elements ordinarilly mounted on a first framework and each settable from a first to a second stable state position, a plurality of members mounted on a second framework and each settable from a first to a second stable state position, each of said members being interposed between a respective pair of registering elements, cyclically operable drive means for reciprocating said frameworks relative to each other for a predetermined number of cycles, each cyclic reciprocation comprising relative movement in a first direction followed by relative movement in a second direction; means for setting a first registering element to the second stable state position; means operable in response to relative movement in the first direction and under the control of said first registering element to set an adjacent member from its first stable state position to its second stable position; means operable in response to relative movement in the second direction and under the control of said member to set an adjacent second registering element to the second stable state position; and means for returning said first registering element to the first position during the relative movement in the second direction.

3. In a shift register: a first frame member, a second frame member, first toggle elements ordinally located on said first frame member, each element standing normally set in a first stable state position and alternatively settable to stand in a second stable state position, second toggle elements interordinally located one each between respective adjacent first toggle elements and located on said second frame member, said second toggle elements normally standing in a first stable state position and alternatively settable to stand in a second stable state position, means for moving the second frame in a rightward direction with respect to said first frame for setting each second toggle element in accordance with the setting of the respective adjacent right-hand first toggle, and means for moving the second frame in a leftward direction with respect to said first frame for setting each respective adjacent left-hand first toggle in accordance with the setting of said second toggle elements.

4. In a binary data shift register, a fixed frame member, a movable frame member, means for reciprocating said movable frame member for a predetermined number of cycles, a plurality of toggle elements ordinally pivoted to said fixed frame, and each element having a toe projection and upper and lower heel contact areas and each settable to stand at a first data-representative position and alternatively settable to stand at a second data-representative position, a plurality of interordinal toggle members pivoted to said movable frame member and each arranged to lie substantially in the plane of the adjacent first toggle elements for cooperation therewith, each interordinal toggle member having a toe projection and upper and lower heel contact areas and each settable to a first data-representative position and alternatively settable to a second data-representative position, means for setting a lowest ordinally located toggle element from the first position to the second position while the movable frame is substantially at the beginning of a first rearward stroke, means for causing a toe projection of said toggle element to contact a heel area of the adjacent higher interordinal toggle member during the first rearward stroke to thereby set said adjacent toggle member from the first position to the second position, and means for causing a toe projection of said toggle member to contact a heel area of a second toggle element in the higher adjacent ordinal location during a first forward stroke for setting said adjacent second toggle element to the second position, whereby a value as represented by the first and second positions of a toggle element is successively shifted one order for each cycle of reciprocation of the movable frame member.

5. A shift register as described in claim 4, including means for setting said first toggle element from the second position to the first position during said forward stroke.

6. A shift register having N indicating orders comprising: a first frame member; a second frame member; means operable to reciprocate said frame members for N cycles relative to each other; indicating toggles selectively settable to a first or a second value representative position and ordinally located on said first frame; interordinal toggles located on said second frame and settable to a first or a second value representative position; means to move an indicating toggle to a selected value representative position; means operable during a portion of a cycle of reciprocation and under the control of the moved toggle to set the adjacent interordinal toggle to a corresponding value representative position; and means operable under the control of the interordinal toggle to set the adjacent higher indicating toggle to a corresponding value representative position during a portion of a reciprocating cycle, whereby at the conclusion of N cycles of operation the selected value is indicated by the value representative position of the Nth ordinal indicating toggle.

7. A shift register comprising a plurality of ordinally located value representative members, means for setting a value representative member to a discrete value representative position, a plurality of interordinal members each located between a respective pair of value representative members, means for moving said interordinal members simultaneously in a first direction relative to the value representative members, means operable under the control of individual value representative members to set respective interordinal members each to a corresponding value representative position, means for moving said interordinal members simultaneously in a second direction relative to the value representative members, and means operable under the control of each of said interordinal members for setting the value representative members in the respective adjacent higher orders in accordance with the value representative setting of each interordinal member.

8. A recirculating shift register comprising a plurality of ordinally located data-representative devices each settable to either a first or a second data-representative position, a plurality of interordinal members each located between a respective pair of adjacent data-representative devices, means for simultaneously moving said interordinal members in a first direction, means operable by said moving means and under the control of each respective lower order data-representative device for setting its adjacent interordinal member to a corresponding data-representative position, means for simultaneously moving said interordinal members in a second direction, means operable by said moving means and under the control of each respective interordinal member for setting its adjacent higher order data-representative device to a corresponding data-representative position, and communicating means between a higher order device and a lower order device for setting the lower device in accordance with the current data-representative position of the higher order device.

9. A recirculating shift register comprising: a plurality of ordinally located data-representative devices each settable to either a first or a second data-representative position, a plurality of interordinal members each located between respective adjacent data-representative devices, means for simultaneously moving said interordinal members in a first direction, means operable by said moving means and under the control of each respective lower order data-representative device for setting its adjacent interordinal member to a corresponding data-representative position, means for simultaneously moving said interordinal members in a second direction, means operable by said moving means and under the control of each respective interordinal member for setting its adjacent higher order data-representative device to a corresponding data-representative position, and communicating means between a higher order member and a lower order member for setting the lower order member in accordance with the current data-representative position of the higher order member.

10. In a recirculating binary shift register: a plurality of binary value representative devices, a plurality of binary value representative members each interposed between an adjacent pair of devices, means for moving said members in the rightward direction, means operable during movement in said rightward direction and under the control of adjacent devices for setting respective members to values corresponding to the binary value position of said devices, means for moving said set members in the leftward direction, means operable during movement in said leftward direction and under the control of said set members for setting the respective adjacent higher order devices in accordance with the binary settings of individual members, recirculating means connecting a higher order device with a lower order device for setting said lower order device in accordance with the current setting of said higher order device, and means operable under the control of at least one device for setting an electrical energy level in accordance with the current binary setting of said device.

11. In a device for shifting data ordinally: a first ordinally located device, a second ordinally located device and an interordinal member located between said first and second devices, each device and member having a toe projection and an upper and lower heel contact area, each device and member normally standing at any data-representative position and settable to an alternate data-representative position; means for setting said first device from the first data-representative position to the second data-representative position; means for moving said interordinal member toward said first device to engage the heel contact area of said interordinal member with the toe projection of said first device to thereby set said interordinal member to the second data-representative position; and means for moving said interordinal member toward said second device to engage a toe projection of said interordinal member with the heel contact area of said second device to thereby set said second device to the second data-representative position.

12. A mechanical binary shift register comprising at least first and second bistable indicating devices, a bistable member interposed between said first and said second indicating devices, means for selectively moving said member into respective positions of engagement with said first and said second indicating devices, means responsive to movement of said member into engagement with said first device to cause said member to be set in accordance with the state of said first device, and means responsive to movement of said member into engagement with said second device to cause said second device to be set in accordance with the state represented by said member.

13. In a cyclically operable mechanical binary shift register; the combination of a first bistable device standing in a first extreme position, a second bistable device standing in a second one of two extreme positions, cyclically operable means for transferring through mechanical action to said second bistable device the state of said first device, said cyclically operable means comprising in part a bistable member interposed between said first and said second bistable devices and operable during a first portion of a cycle to engage said first device and be set thereby in accordance with the state of said first device, and operable during a second portion of said cycle to engage said second device and to set said second device to said first extreme position.

14. In a cyclically operable, mechanical binary shift register; the combination of a first bistable device standing in a respective one of two extreme positions, a second bistable device standing in a respective one of two extreme positions, cyclically operable means for setting said second bistable device to a mechanically representative position corresponding to the state representative position of said first device, said cyclically operable means comprising in part a bistable member interposed between said first and said second bistable devices, means operable during a first portion of a cycle to engage said member with said first device and to thereby move said member to a position corresponding to the position of said first device, and operable during a second portion of said cycle to disengage said member from said first device, and operable during a third portion of said cycle to engage said member with said second device to thereby move said second device to a position corresponding to said respective position of said first device.

15. In a cyclically operable, mechanical binary shift register; the combination of a first bistable device settable to either one of two positions, a second bistable device settable to either one of two positions, cyclically operable means for mechanically setting said second bistable device to a position corresponding to the position of said first bistable device, said cyclically operable means comprising in part a bistable member settable to either one of two positions and movably interposed between said first and said second bistable devices, said member engaging said first device during a first portion of a cycle to change said member from a respective one of its first and second positions only when said member stands in a position which does not correspond to the position in which said first device stands, and said member being engageable with said second device during a succeeding portion of said cycle to effect a change in the position of said second device only when the position of said member has been changed.

16. A mechanical binary shift register comprising: a plurality of bistable registering members arranged to cooperate in pairs to shift a value cyclically from a first member of a first pair to a first member of a second pair by engagement of a first member of the first pair with a second member of the first pair, and then to shift the value from the second member of the first pair to the first member of the second pair by engagement of the first member of the second pair with the second member of the first pair.

17. A recirculating mechanical shift register comprising a plurality of ordinally located data representative devices each engageable for setting to either a first or a second data-representative position, a plurality of engageable interordinal members each located between a respective pair of adjacent data-representative devices, means operable under the control of each respective data-representative device for engaging and setting an adjacent interordinal member to a corresponding data-representative position, means operable under the control of each interordinal member for engaging and setting an adjacent data-representative device to a corresponding data-representative position, a value entry control means selectively settable to either one of two data-representative positions, an interordinal member located between the value entry control means and a first order data representative device, and connecting means between a terminal order device and the value entry control means to set the value entry control means to a position corresponding to the data-representative position of the terminal order device.

18. A recirculating mechanical shift register comprising a plurality of ordinally located data-representative devices each engageable for setting to either a first or a second data-representative position, a plurality of engageable interordinal members each located between a respective pair of adjacent data-representative devices, means operable under the control of each respective data-representative device for engaging and setting an adjacent interordinal member to a corresponding data-representative position, means operable under the control of each interordinal member for engaging and setting an adjacent data-representative device to a corresponding data-representative position, connecting means between a higher order device and a lower order device for setting the lower order device in accordance with the current data-representative position of the higher order device, and means operable to supersede said connecting means and to set said lower order device to a selected data-representative position.

19. A mechanical registering mechanism comprising a plurality of individual shift registers, each register comprising a plurality of ordinally located engageable data-representative devices, and each device settable to either one of two data-representative positions, a plurality of engageable interordinal members each interposed between a respective pair of adjacent devices, means for setting a first order device of a first register to a selected one of said two positions, means operable under the control of each respective data-representative device to engage and set an adjacent interordinal member to a corresponding data-representative position, means operable under the control of each interordinal member for engaging and setting an adjacent data-representative device to a corresponding data-representative position, and means operable to connect a terminal order device of said first register to a first order device of a second shift register to set said first order device to a data-representative position corresponding to the current data-representative position of said terminal order device.

20. A registering mechanism comprising a plurality of individual mechanical shift registers, each register comprising a plurality of ordinally located data-representative devices, each device being engageable for setting to a selected data-representative position, a plurality of engageable interordinal members each interposed between a respective pair of adjacent data-representative devices, means for engaging and setting a first order device of a first register to a selected data-representative position, means operable under the control of each respective data-representative device for engaging and setting the adjacent interordinal member to a corresponding data-representative position, means operable under the control of each interordinal member for engaging and setting a next adjacent order data-representative device to a corresponding data-representative position, means for connecting a terminal order device of the first shift register to a first order device of the second shift register to move the first order device ot a position corresponding to the position to which the terminal order device is moved, and means operable to supersede the connecting means and independently control the setting of the first order device of the second register to a selected data-representative position.

21. A decimal value readout mechanism comprising ten mechanical shift registers, each registering only one of ten respective digits, each register having ordinally arranged devices for registering successively higher ordinal values of a respective digit, means for entering a decimal value in the readout mechanism including a respective entry mechanism for entering a respective digit in the first order of each shift register, and means operable in response to entry of each successive digit in any register for shifting all previously entered digits from respective current ordinal positions to respective adjacent higher ordinal positions.

22. A decimal value readout mechanism comprising ten juxtaposed mechanical shift registers, each registering only one of ten respective digits; means for entering a decimal value in the readout mechanism including a respective entry mechanism for entering a digit in a first order of each shift register; means operable in response to entry of each successive digit in a register for shifting all previously entered digits from their respective current ordinal positions to adjacent ordinal positions, comprising in each register, a plurality of ordinally located engageable data-representative members, a plurality of engageable interposed devices each located between a respective pair of adjacent data-representative members; and means operable first for engaging and setting said interposed devices in accordance with the settings of first adjacent ordinal members and means operable next for engaging and setting second adjacent ordinal members in accordance with the settings of said interposed devices.

References Cited in the file of this patent

UNITED STATES PATENTS

| | | |
|---|---|---|
| 1,195,575 | Gardner | Aug. 22, 1916 |
| 2,411,540 | Haigh | Nov. 26, 1946 |
| 2,444,042 | Hartley et al. | June 29, 1948 |
| 2,549,559 | Wuischpard | Apr. 17, 1951 |
| 2,585,630 | Crosman | Feb. 12, 1952 |
| 2,654,080 | Browne | Sept. 29, 1953 |
| 2,683,819 | Rey | July 13, 1954 |
| 2,753,545 | Lund | July 3, 1956 |
| 2,754,052 | Capellaro | July 10, 1956 |
| 2,788,940 | Terry et al. | Apr. 16, 1957 |
| 2,789,766 | Wood | Apr. 23, 1957 |
| 2,803,812 | Rajchman et al. | Aug. 20, 1957 |
| 2,844,310 | Cartwright | July 22, 1958 |

UNITED STATES PATENT OFFICE

CERTIFICATION OF CORRECTION

Patent No. 2,973,898 March 7, 1961

Eugene E. Reynolds

It is hereby certified that error appears in the above numbered patent requiring correction and that the said Letters Patent should read as corrected below.

In the grant, lines 2 and 3, for "assignor to Marchant Calculators, Inc., a corporation of California," read -- assignor to Smith-Corona Marchant Inc., a corporation of New York, --; line 12, for "Marchant Calculators, Inc., its successors" read -- Smith-Corona Marchant Inc., its successors --; in the heading to the printed specification, lines 3, 4 and 5, for "assignor to Marchant Calculators, Inc., a corporation of California" read -- assignor to Smith-Corona Marchant Inc., a corporation of New York --.

Signed and sealed this 19th day of September 1961.

(SEAL)
Attest:

ERNEST W. SWIDER — DAVID L. LADD

Attesting Officer — Commissioner of Patents